US011880884B2

(12) United States Patent
Weiss et al.

(10) Patent No.: US 11,880,884 B2
(45) Date of Patent: *Jan. 23, 2024

(54) METHODS AND SYSTEMS TO PREVENT ADVERSE EXCHANGE LIMIT EFFECTS

(71) Applicant: TRADING TECHNOLOGIES INTERNATIONAL, INC., Chicago, IL (US)

(72) Inventors: Thomas Jeffrey Weiss, Skokie, IL (US); Michael Unetich, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,865

(22) Filed: Jun. 23, 2022

(65) Prior Publication Data

US 2022/0318910 A1 Oct. 6, 2022

Related U.S. Application Data

(63) Continuation of application No. 16/861,618, filed on Apr. 29, 2020, now Pat. No. 11,397,988, which is a
(Continued)

(51) Int. Cl.
*G06Q 40/04* (2012.01)
*H04L 51/226* (2022.01)
(Continued)

(52) U.S. Cl.
CPC .......... *G06Q 40/04* (2013.01); *H04L 43/0864* (2013.01); *H04L 51/046* (2013.01); *H04L 51/226* (2022.05)

(58) Field of Classification Search
CPC ... G06Q 40/04; H04L 43/0864; H04L 51/046; H04L 51/226
See application file for complete search history.

(56) References Cited

U.S. PATENT DOCUMENTS 5,367,523 A 11/1994 Chang et al.
6,442,139 B1 8/2002 Hosein
(Continued)

FOREIGN PATENT DOCUMENTS

JP 2004-522212 A 7/2004
JP 2006-293852 A 10/2006
(Continued)

OTHER PUBLICATIONS

Guilbaud et al.: Optimal High Frequency Trading with Limit and Market Orders, Jun. 24, 2011, pp. 1-22. (Year: 2011).*
(Continued)

*Primary Examiner* — Bijendra K Shrestha
(74) *Attorney, Agent, or Firm* — McDonnell Boehnen Hulbert & Berghoff LLP

(57) ABSTRACT

Methods and systems to prevent adverse exchange limit effects are disclosed. An example method of message management includes tracking, at a gateway, a transaction count of trade messages communicated to an exchange via an exchange link. The example method includes defining a first transaction limit based on the transaction count, and calculating a second transaction limit as a function of the first transaction limit, wherein the second transaction limit is to correspond to a reserve capacity associated with the exchange link. The example method includes assigning a message priority to each of a plurality of trade messages to communicate to the exchange. The example method includes communicating trade messages of the plurality of trade messages having a first message priority to the exchange when the transaction count is greater than the second transaction limit, and delaying or rejecting trade messages of the plurality of trade messages having a second message priority.

9 Claims, 8 Drawing Sheets

Related U.S. Application Data continuation of application No. 16/031,542, filed on Jul. 10, 2018, now Pat. No. 10,679,289, which is a continuation of application No. 13/718,949, filed on Dec. 18, 2012, now Pat. No. 10,049,404.

(51) Int. Cl.
*H04L 43/0864* (2022.01)
*H04L 51/046* (2022.01)

(56) References Cited

U.S. PATENT DOCUMENTS

| | | |
|---|---|---|
| 6,836,763 B1 | 12/2004 | Munsil et al. |
| 6,996,626 B1 | 2/2006 | Smith |
| 7,000,025 B1 | 2/2006 | Wilson |
| 7,124,110 B1 | 10/2006 | Kemp, II et al. |
| 7,461,026 B2 | 12/2008 | Schluetter |
| 7,523,213 B1 * | 4/2009 | Shen .............. H04L 67/568 709/224 |
| 7,593,896 B1 | 9/2009 | Flitcroft et al. |
| 7,668,741 B2 | 2/2010 | Ernest et al. |
| 7,752,115 B2 | 7/2010 | Schluetter |
| 7,869,794 B1 | 1/2011 | Weaver |
| 7,904,434 B2 | 3/2011 | Yalamanchi et al. |
| 8,108,297 B2 | 1/2012 | Schluetter |
| 8,249,976 B1 | 8/2012 | Prybell, Jr. et al. |
| 8,345,561 B2 | 1/2013 | Edwards et al. |
| 8,370,251 B2 | 2/2013 | Schluetter |
| 8,494,954 B2 | 7/2013 | Schluetter |
| 8,589,948 B2 | 11/2013 | Kemp, II et al. |
| 8,612,330 B1 | 12/2013 | Certain et al. |
| 8,732,313 B2 | 5/2014 | Gulati et al. |
| 8,839,269 B2 | 9/2014 | Kemp, II et al. |
| 8,947,522 B1 | 2/2015 | Hickman et al. |
| 10,049,404 B2 | 8/2018 | Weiss et al. |
| 10,679,289 B2 | 6/2020 | Weiss et al. |
| 2002/0023048 A1 | 2/2002 | Buhannic et al. |
| 2003/0103486 A1 | 6/2003 | Salt et al. |
| 2004/0225729 A1 | 11/2004 | Sabiers et al. |
| 2004/0246907 A1 | 12/2004 | Hoffmann |
| 2005/0137961 A1 | 6/2005 | Brann et al. |
| 2006/0285509 A1 | 12/2006 | Asplund |
| 2007/0009015 A1 | 1/2007 | Kunii et al. |
| 2007/0143290 A1 | 6/2007 | Fujimoto et al. |
| 2008/0031136 A1 | 2/2008 | Gavette et al. |
| 2009/0055835 A1 | 2/2009 | Zhu |
| 2010/0228833 A1 * | 9/2010 | Duquette .............. G06Q 30/06 709/207 |
| 2011/0145125 A1 * | 6/2011 | Foygel .............. G06Q 30/0601 705/26.1 |
| 2013/0058212 A1 | 3/2013 | Noy et al. |
| 2014/0156488 A1 | 6/2014 | Schluetter |
| 2014/0172662 A1 | 6/2014 | Weiss et al. |
| 2015/0178838 A1 | 6/2015 | Kemp, II et al. |
| 2018/0336630 A1 | 11/2018 | Weiss et al. |
| 2020/0273105 A1 | 8/2020 | Weiss et al. |

FOREIGN PATENT DOCUMENTS

| | | | |
|---|---|---|---|
| JP | 2007-265245 A | 10/2007 | |
| JP | 2008-191819 A | 8/2008 | |
| JP | 2009-527839 A | 7/2009 | |
| JP | 2012-033134 A | 2/2012 | |
| WO | 2001/91000 A2 | 11/2001 | |
| WO | 2004/08309 A1 | 1/2004 | |
| WO | WO-2004008309 A1 * | 1/2004 | .............. G06F 9/546 |
| WO | 2005/55002 A2 | 6/2005 | |
| WO | 2007/96870 A2 | 8/2007 | |
| WO | WO-2007096870 A2 * | 8/2007 | .............. G06Q 10/04 |
| WO | 2012/50679 A2 | 4/2012 | |

OTHER PUBLICATIONS

Cesari et al.: Effective Trade Execution, Jun. 2012, University of Bologna, pp. 1-28 (Year: 2012).*
Valzah et al.: Topics in High Performance Messaging, Mar. 2011, Informatica, pp. 1-50 (Year: 2011).*
Williams, Nia: In Quiet Markets, Fx Traders Hunt New Opportunities, May 2, 2012, Reuters, pp. 1-5 (Year: 2012).*
Cesari, et al.: Effective Trade Execution, Jun. 2012, pp. 1-28. (Year: 2012).
International Search Report and Written Opinion of International Application No. PCT/US2013/035648, dated Aug. 12, 2013 (dated Aug. 19, 2013).
Thekkath, et al.: Limits to low-latency communication in high-speed networks, 1993, ACM, pp. 179-203. (Year: 1993).
Moallemi, et al.: The cost of latency in high-frequency trading, Feb. 5, 2013, pp. 1-55 (Year: 2013).
Pan, Michael: Real time communication over UDP Protocol, Nov. 15, 2011, Code Project, pp. 1-16 (Year: 2011).

* cited by examiner

METHODS AND SYSTEMS TO PREVENT ADVERSE EXCHANGE LIMIT EFFECTS

CROSS REFERENCE TO RELATED APPLICATIONS

The present application is a continuation of U.S. patent application Ser. No. 16/861,618, filed Apr. 29, 2020, now U.S. Pat. No. 11,397,988, which is a continuation of U.S. patent application Ser. No. 16/031,542, filed Jul. 10, 2018, now U.S. Pat. No. 10,679,289, which is a continuation of U.S. patent application Ser. No. 13/718,949, filed Dec. 18, 2012, now U.S. Pat. No. 10,049,404, the entire contents of each of which are incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

Electronic exchanges often include messaging and/or transaction limits in their systems. Some transaction limits may cause a halt in trading for all participants, while some transaction limits may effect only a single trader's ability to execute orders. In some cases, the transaction limits are not provided to the market participants.

BRIEF DESCRIPTION OF THE FIGURES

Certain embodiments are disclosed with reference to the following drawings.

Figure 1:
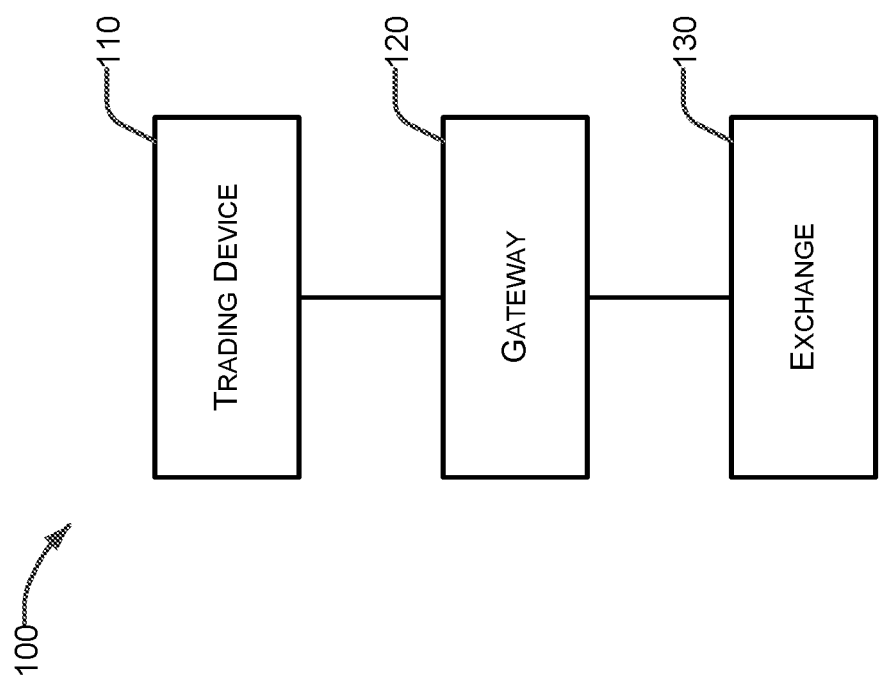
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading environments and, more particularly, to methods and systems to prevent adverse exchange limit effects.

An exchange may impose a limit on the number of transactions that may be communicated to the exchange over a period of time (e.g., an exchange transaction limit or throttle limit). However, the exchange may not provide (or inform) the limit to the participants of the trading system. When the transaction limit is reached, the exchange may hold or delay additional received trade messages, may charge or otherwise penalize the sender for the trade messages in excess of the transaction limit or may simply reject trade messages received after the transaction limit is reached. Prior systems make no determination of the transaction limit and, thus, continue to send or communicate trade messages to the exchange only to have them rejected by the exchange. As a result, high priority or "critical" trade messages may not be executed.

Embodiments disclosed herein recognize that to prevent these adverse exchange limit effects, high priority trade messages should be communicated to the exchange when they will be executed by the exchange. Unlike prior trading systems, embodiments disclosed herein implement reserving a number of trade messages to ensure that high priority trade messages can be communicated to the exchange without receiving a rejection message or other undesirable outcomes. Specifically, the reserve capacity is calculated by monitoring the throughput of transactions communicated to the exchanges and the corresponding response messages. According to embodiments disclosed herein, the exchange transaction limit can be discovered (or defined) by tracking the number of transactions communicated before a rejection message is received. According to embodiments disclosed herein, an artificial transaction limit may be calculated as a function of the exchange transaction limit. In some examples, the difference between the exchange transaction limit and the artificial transaction limit creates a reserve capacity of trade messages. In some examples, the low priority trade messages are rejected (e.g., canceled, delayed, etc.) while the reserve capacity is used to communicate the high priority trade messages to the exchange. In some such embodiments, the reserve capacity may be used to communicate high priority trade messages while preventing (or canceling) low priority trade messages.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Certain embodiments provide a method of message management including tracking, at a gateway, a transaction count of trade messages communicated to an exchange via an exchange link. The example method also includes defining a first transaction limit based on the transaction count. The example method also includes calculating a second transaction limit as a function of the first transaction limit, wherein the second transaction limit is to correspond to a reserve capacity associated with the exchange link. The example method also includes assigning a message priority to each of a plurality of trade messages to communicate to the exchange. The example method also includes communicating trade messages of the plurality of trade messages having a first message priority to the exchange when the transaction count is greater than the second transaction limit, and delaying trade messages of the plurality of trade messages having a second message priority.

Certain embodiments provide a method of message management including communicating, via a gateway, a plurality of trade messages to an exchange. The example method also includes tracking a transaction count of trade messages communicated via an exchange link. The example method also includes calculating a message latency associated with each of a plurality of response messages received at the gateway in response to the plurality of trade messages. The example method also includes defining a transaction limit based on the transaction count and the message latency.

Certain embodiments provide a method of message management including communicating, via a gateway, a plurality of trade messages to an exchange. The example method also includes tracking a transaction count of trade messages communicated via an exchange link. The example method also includes, in response to receiving a rejection message via the exchange link, defining a transaction limit based on the transaction count.

Certain embodiments provide a method of message management including defining a transaction limit of an exchange link. The example method also includes calculating, via a processor, a second transaction limit based on the transaction limit, wherein the second transaction limit is to correspond to a percentage of the transaction limit. The example method also includes communicating, via the exchange link, a plurality of trade messages to an exchange based on the second transaction limit and an order policy.

Certain embodiments provide a method of message management including tracking, at an exchange, a transaction count of trade messages received via an exchange link from a gateway. The example method also includes comparing the transaction count to a portion of a transaction limit to form an indication. The example method also includes communicating a warning message to the gateway based on the indication.

Certain embodiments provide a method of message management including assigning a message priority to each of a plurality of trade messages at a gateway, wherein the gateway is to communicate each of the plurality of trade messages to an exchange. The example method also includes, when a transaction count is a portion of a transaction limit, wherein the transaction count is to correspond to a number of trade messages communicated to the exchange, communicating trade messages of the plurality of trade messages having a first message priority to the exchange, and delaying trade messages of the plurality of trade messages having a second message priority.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The example electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, how the gateway 120 interacts with the exchange 130 is referred to as an exchange link. For example, the gateway 120 may communicate with the exchange 130 via an exchange link using a local area network, a wide area network, a virtual private network, a T1 line, a T3 line, an ISDN line, a point-of-presence, the Internet, and/or a shared memory system.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
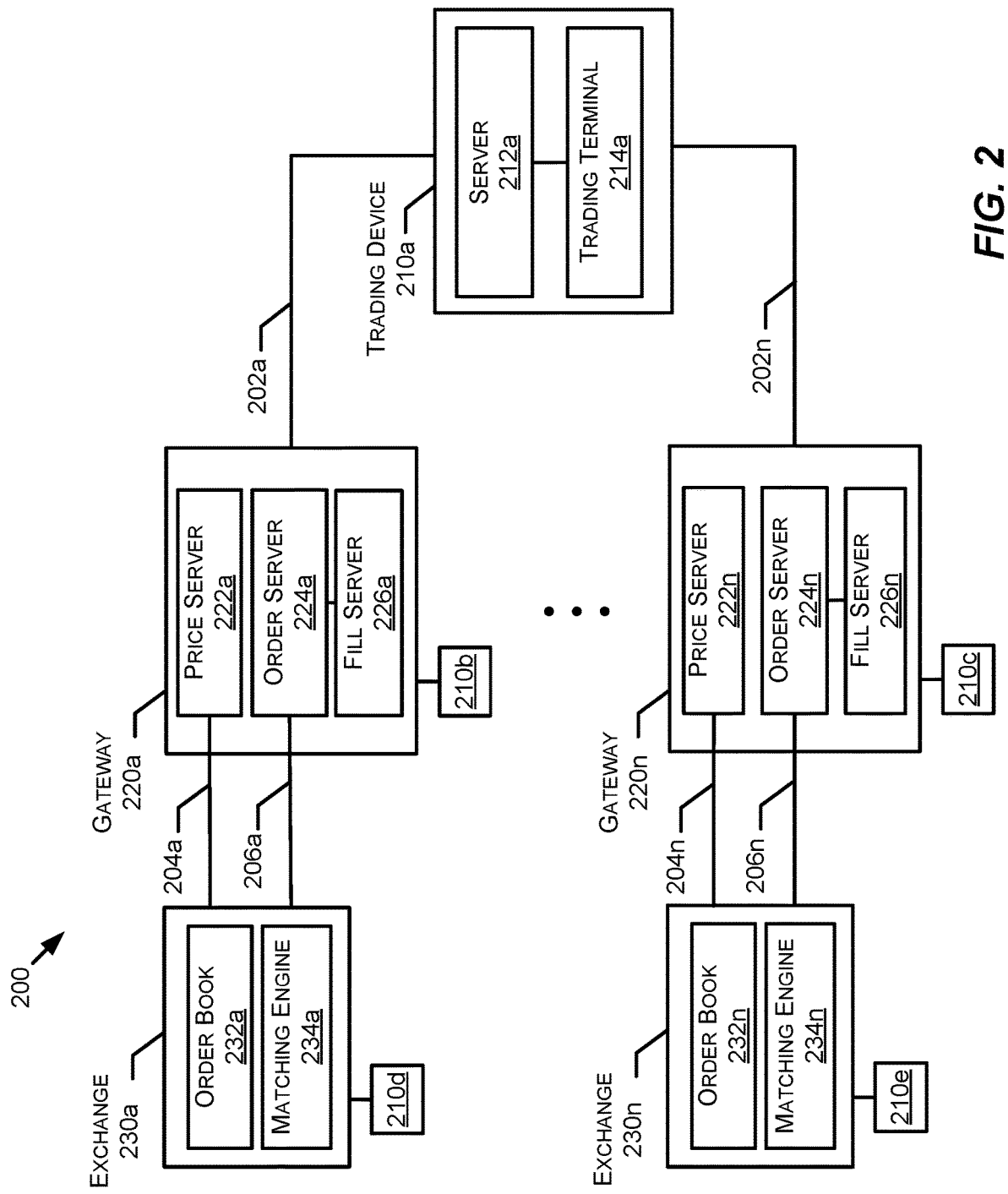
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a gains latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks (or exchange links within a network). For example, as shown in FIG. 2, there may be two communication networks connecting the gateway 220a and the exchange 230a. The network (or exchange link) 204a may be used to communicate market data to the price server 222a. In some instances, the exchange 230a may include this data in a data feed that is published to subscribing devices. The network (or exchange link) 206a may be used to communicate order data. In some examples, the exchange 230a may be associated with a maximum number of transactions that may be communicated via an exchange link over a transaction interval (e.g., a transaction period, an order entry interval, etc.). For example, transactions communicated to the exchange 230a that exceed the transaction limit during a transaction interval may not be executed by the exchange 230a.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. EXAMPLE COMPUTING DEVICE

Figure 3:
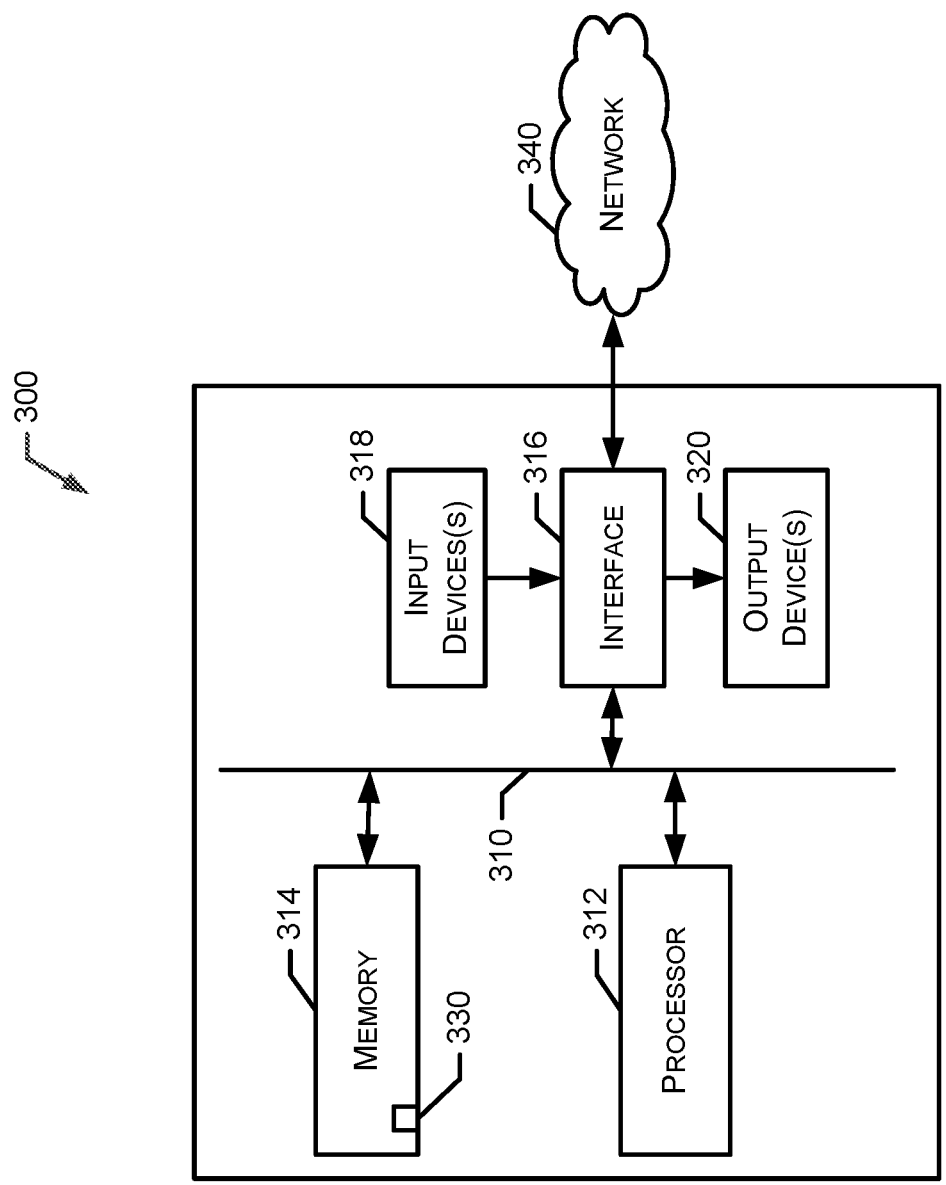
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. EXAMPLES OF PREVENTING ADVERSE EXCHANGE LIMIT EFFECTS AT THE GATEWAY

As described above, gateways may facilitate communication between trading devices and exchanges via network connections. The network connection between a gateway and an exchange may be referred to as an exchange link. For example, the exchange link allows non-exchange software (e.g., software operating on the example gateway 120 of FIG. 1) to interact with exchange software (e.g., software operating on the example exchange 130 of FIG. 1). One gateway may manage different exchange links between one or more exchanges. In some examples, the exchange charges a gateway for the use or creation of an exchange link. To realize the most value from the exchange link, different traders and/or trading devices (e.g., the example trading device 110 of FIG. 1) share the exchange link. As a result, one exchange link between the exchange and the gateway communicates trade messages from several trading devices. However, this also leads to situations where some participants of the trading system (e.g., trading devices) are unaware of the activity in the trading system.

Some exchanges impose limits on the use of the exchange link. For example, the exchange may stop trading a tradeable object if the price of the tradeable object changes more than a certain percentage over a period of time. This type of limit (e.g., a "circuit breaker") effects all participants (e.g., gateways and/or trading devices) downstream from the exchange. A participant is downstream from an exchange if the exchange can communicate a message down to the participant. Other limits may effect only a portion of participants downstream from the exchange. For example, some exchanges impose a transaction limit or throttle limit for an exchange link. That is, an exchange imposes an upper limit (e.g., an exchange transaction limit) on the number of trade messages communicated to the exchange over the exchange link. Trade messages (e.g., trade orders) received when the exchange transaction limit is reached may be rejected by the exchange. In some examples, the exchange cancels (or deletes) a trade message when it is rejected. In other examples, the exchange delays executing the trade message (e.g., includes an artificial delay) rather than canceling the trade message. In some instances, the exchange transaction limit for the exchange link is not provided to the downstream participants. As a result, a participant learns when a trade message exceeds the exchange transaction limit based on the response to the trade message received from the exchange (e.g., a rejection message).

As multiple participants may share an exchange link and the exchange transaction limit may not be known to the participants, no participant is likely to believe that their low volume of trade orders could exceed the exchange transaction limit. However, taken together, any one of the participants may consume the full exchange transaction limit and cause other participants' trade orders to be rejected (e.g., canceled or artificially delayed). As a result, participants are unaware when "critical" trade orders may be rejected. For example, executing high priority trade messages may be needed for a participant to "get flat in a market position." That is, rejecting a trade message may cause a participant to end up with a surplus or deficit of a commodity. Thus, it is beneficial to lower the exchange transaction limit (e.g., calculate an artificial or operational transaction limit), which results in a reserve capacity that can be used to communicate high priority (or critical) trade orders.

Figure 4:
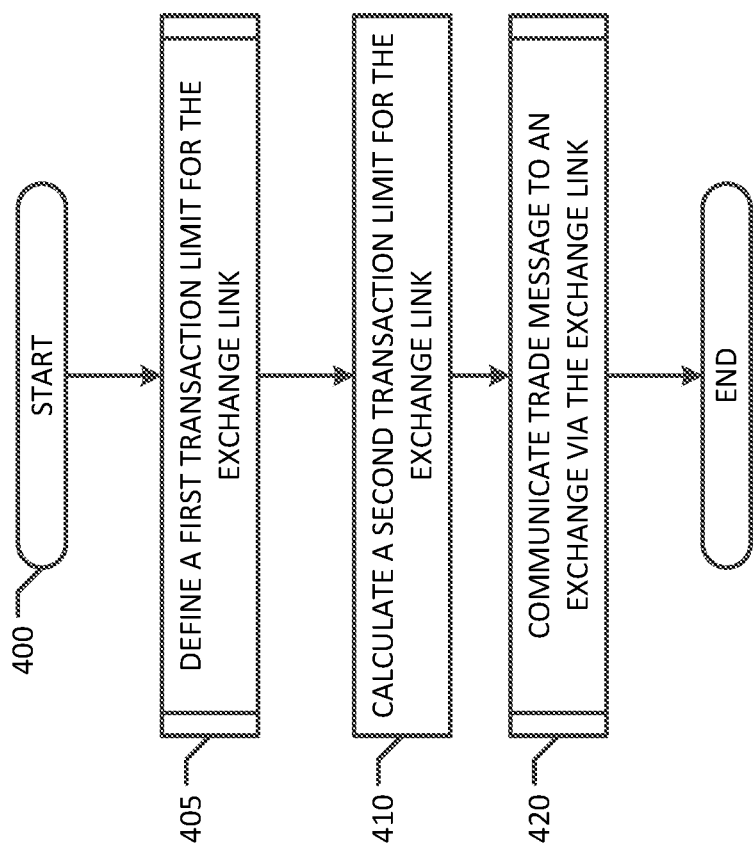
FIG. 4 illustrates a flow diagram representative of example machine readable instructions that may be executed to implement disclosed embodiments.
Figure 5:
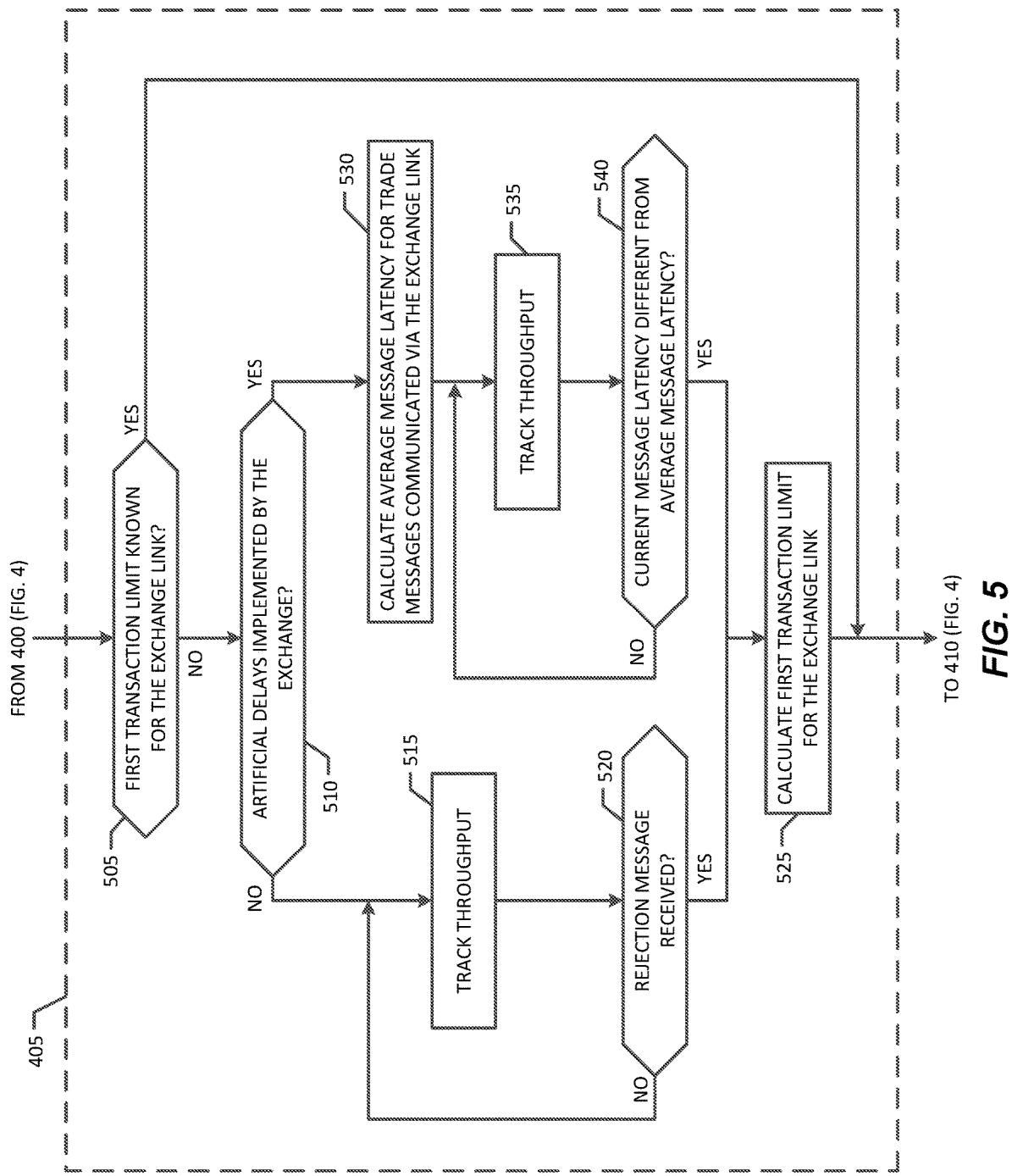
FIG. 5 illustrates a flow diagram representative of example machine readable instructions that may be executed to implement disclosed embodiments.
Figure 6:
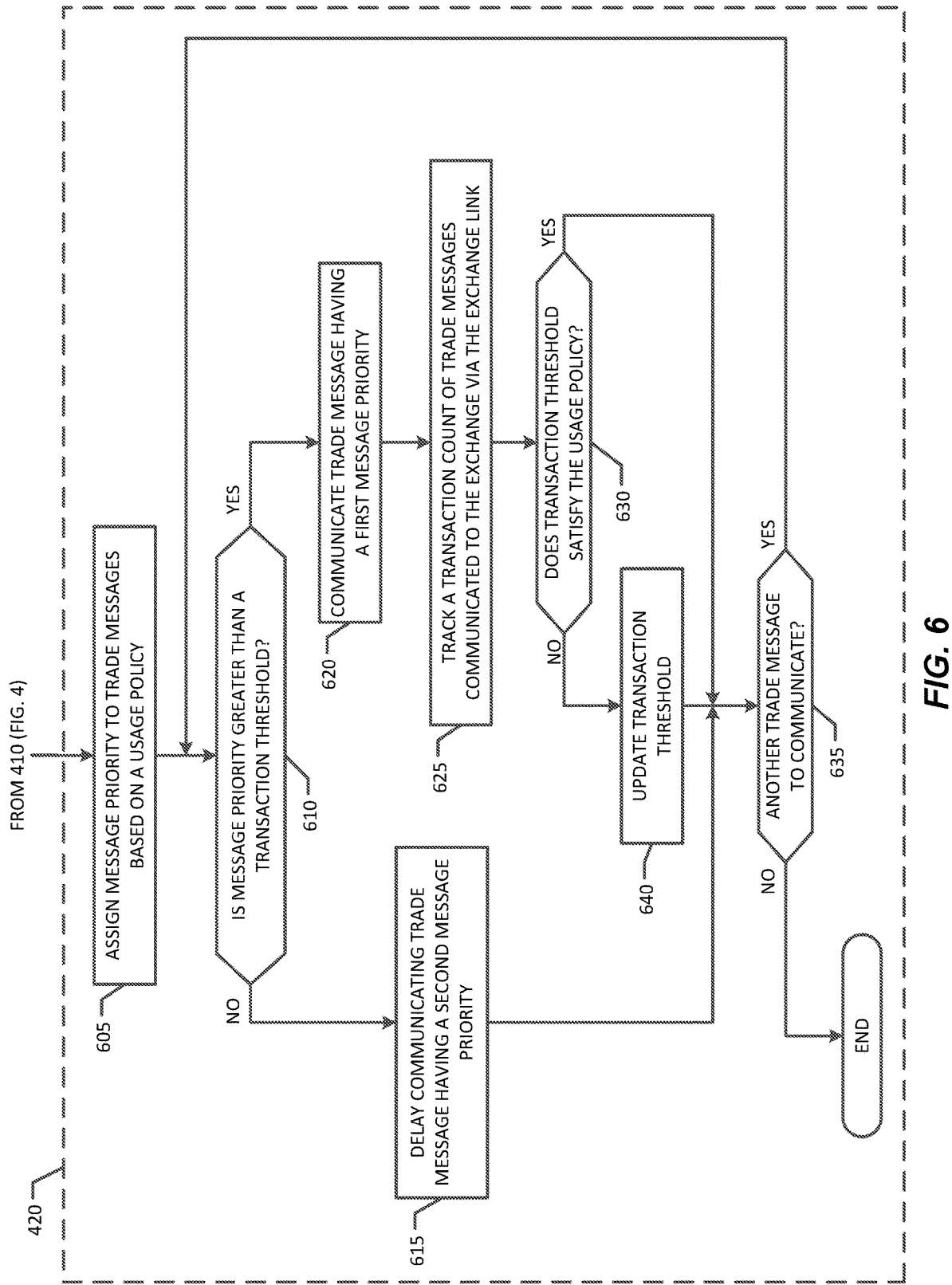
FIG. 6 illustrates a flow diagram representative of example machine readable instructions that may be executed to implement disclosed embodiments.

FIGS. 4-6 are flow diagrams representative of example operations that can be executed to implement the teachings of this disclosure. The example operations of FIGS. 4-6 can be implemented by, for example, the example gateway 120 of FIG. 1 and/or the example gateway 220a of FIG. 2. While the example gateway 120 of FIG. 1 is described as executing the example operations of FIGS. 4-6 below, any suitable device can execute the example operations of FIGS. 4-6. The example operations of FIGS. 4-6 implement preventing adverse exchange limit effects by calculating an artificial transaction limit that is less than the exchange transaction limit of the exchange link so that a reserve capacity of trade messages is available to communicate high priority trade messages.

To prevent adverse exchange limit effects, trade messages are communicated based on an artificial (or operational) transaction limit of an exchange link. In the example of FIG. 4, an artificial (or operational) transaction limit is calculated for the exchange link based on an exchange transaction limit. The example process 400 of FIG. 4 begins by defining an exchange transaction limit for an exchange link (block 405). Settings at the example exchange 130 limit the number of trade messages communicated over a time period (e.g., during a transaction interval) over an exchange link (e.g., a transaction limit). For example, the exchange 130 having a five second transaction interval may set a transaction limit of 1000 transactions per transaction interval for the exchange link. As a result, trade messages communicated once the transaction limit is reached may not be executed (during the transaction interval). In some examples, the transaction interval is a sliding window. For example, the exchange 130 limits the number of trade messages to 1000 during a sliding, five second window. That is, during any continuous five second period, a maximum number of 1000 trade messages can be communicated via the exchange link. In some examples, the transaction intervals are independent and defined time periods. For example, a five second transaction interval starts at a zero second mark and concludes at a five second mark. In some examples, the exchange transaction limit is known (e.g., the exchange may broadcast the exchange transaction limit or may provide the exchange transaction limit when requested by the gateway). In other examples, the exchange transaction limit is estimated by the gateway. In some examples, the exchange transaction limit varies based on the time of day, the market conditions, etc. Thus, the exchange transaction limit is monitored (or calculated/estimated) periodically or aperiodically throughout the trading period.

FIG. 5 is a flow diagram representative of example operations that can be executed to implement block 405 of FIG. 4, which defines the exchange transaction limit. In the example of FIG. 5, the exchange transaction limit is calculated based on feedback received from the example exchange 130. The example process of FIG. 5 begins by determining whether the exchange transaction limit for the exchange link is known (block 505). In some examples, the exchange 130 may provide the transaction limit for the exchange link to the example gateway 120. When the exchange transaction limit is provided by the example exchange 130, that transaction limit is stored (e.g., recorded by the example gateway 120). The example process of FIG. 5 then ends and control continues to block 410 of FIG. 4.

When the exchange transaction limit is not known to the example gateway 120 (block 505), a determination is made whether the example exchange 130 implements an artificial delay when the exchange transaction limit is reached (block 510). For example, the example exchange 130 may delay executing a trade order rather than deleting the trade order. When the example exchange 130 does not implement an artificial delay, the throughput of trade messages communicated via the exchange link is tracked (block 515) and the response messages received from the example exchange 130 are monitored (block 520). By tracking the throughput over a period of time, the number of trade messages communicated to the example exchange 130 is known. As a result, when a rejection message in response to a trade message is received from the example exchange 130 (block 520), the exchange transaction limit is calculated based on the tracked throughput prior to receiving the rejection message (block 525). For example, if the tracked throughput of trade messages per second over a five second period is 298, 296, 299, 301 and 300, but a rejection message is received in response to trade message number 301 during the fourth second (block 520), a 300 trade messages per transaction interval exchange transaction limit for the exchange link is calculated (block 525). The example process of FIG. 5 then ends and control continues to block 410 of FIG. 4.

When the example exchange 130 does implement an artificial delay (block 510), an average message latency for trade messages communicated via the exchange link is calculated (block 530). In the illustrated example, the average message latency is calculated by monitoring the round-trip time of trade messages. That is, an average of a time between when a trade message is communicated by the example gateway 120 and when a response message to the trade message is received by the gateway 120 is calculated. The average message latency may be calculated by recording and tracking the message identifier and time stamps associated with each trade message communicated through the gateway 120. Alternatively, the gateway 120 may be configured to track message identifiers and record time information as each trade message is received and/or transmitted. The example process tracks the throughput of trade messages communicated (block 535) and compares a current message latency to the average message latency (block 540). That is, because the example exchange 130 implements an artificial delay when the transaction limit is reached, a spike in the message latency indicates the transaction limit was reached. As a result, when a message latency is different from the average message latency (block 540), the exchange transaction limit is calculated based on the throughput prior to the change (block 525). In some examples, the current message latency is compared to a running average of message latencies to smooth out the latencies. The example process of FIG. 5 then ends and control proceeds to block 410 of FIG. 4.

Returning to the example process of FIG. 4, an artificial (or operational) transaction limit is calculated based on the exchange transaction limit (block 410). The artificial transaction limit is a limit imposed by the gateway 120 that is less than the exchange transaction limit. The difference creates a reserve capacity of trade message to use. In some examples, the reserve capacity is accessed in accordance with a usage policy. A usage policy may specify a priority order for trade messages to communicate via the exchange link. For example, when a transaction count (e.g., the number of trade messages communicated (or sent) during the transaction interval) reaches the artificial transaction limit, the reserve capacity is accessed to communicate trade messages according to the usage policy. As a result, high priority trade messages (e.g., trade messages that improve the inside market) may be ensured to be executed by the example exchange 130. For example, a trade message canceling a trade order, a trade message adding a trade order and a second trade message canceling a second trade order are received by the example gateway 120 with a reserve capacity of two trade messages. According to an example usage policy, a trade message canceling a trade order is prioritized over a trade message adding or changing a trade order. As each trade message communicated to the example exchange 130 counts towards the exchange transaction limit, and the example gateway 120 has a reserve capacity of two trade messages, the gateway 120 communicates the two trade messages canceling trade orders to the exchange 130 via the exchange link. In some examples, the gateway 120 cancels the trade message adding the trade order. In some other examples, the gateway 120 delays communicating the trade message adding the trade order until the next transaction interval. In some other examples, the usage policy controls the volume of message traffic once the artificial (or operational) transaction limit has been reached. For example, the usage policy may limit the number of messages communicated in a given time period to prevent reaching the exchange transaction limit. In some other examples, the usage policy limits which traders may make trades once the artificial (or operational) transaction limit is reached. For example, upon reaching the artificial transaction limit, the usage policy restricts communicating trade messages to traders who have been designated as a market maker (e.g., a trader who quotes a buy price and a sell price for a tradeable object to facilitate trading in that tradeable object), and/or to any trader who has an unhedged position (e.g., an increased risk position in a tradeable object by not assuming a position in a contrary (or opposing or offsetting) tradeable object).

The artificial transaction limit is calculated as a function of the exchange transaction limit. In the illustrated example, the artificial transaction limit is a portion (or fraction, percentage, etc.) of the exchange transaction limit. In some examples, the artificial transaction limit may be a constant number of trade messages less than the exchange transaction limit (e.g., the artificial transaction limit is 100 trade messages less than the exchange transaction limit). In some examples, the relationship between the artificial transaction limit and the exchange transaction limit may vary based on the conditions of the market. For example, the relationship may vary depending on the time of day (e.g., start of a trading period, end of a trading period, etc.), the cumulative volume of trade messages communicated to the exchange via different exchange links, etc.

When the transaction limits (e.g., the exchange transaction limit, the artificial transaction limit) are known (blocks 405 and 410), the example gateway 120 communicates trade messages to the example exchange 130 via the exchange link based on the usage policy and the transaction count (block 420). To this end, the example gateway 120 assigns a message priority to trade messages and communicates the trade messages having a message priority greater than a threshold priority. For example, the gateway 120 communicates to the exchange 130 trade messages having the highest priority when using the reserve capacity while delaying other trade messages.

FIG. 6 is a flow diagram representative of example operations that can be executed to implement block 420 of FIG. 4, which communicates trade messages from a gateway to an exchange. In the example of FIG. 6, the example gateway 120 communicates trade messages having a message priority greater than a transaction threshold. In some examples, the transaction threshold varies based on a usage policy selected by, for example, the participants of the trading system 100 of FIG. 1. The example process of FIG. 6 begins by assigning a message priority to trade messages received during the transaction interval (block 605). For example, the trading device 110 of FIG. 1 communicates trade messages to the gateway 120 to be executed by the exchange 130. In the illustrated example, the example gateway 120 assigns a message priority to each of the trade messages based on a usage policy. In the illustrated example, the usage policy determines which trade messages are communicated to the example exchange 130 during the transaction interval. In some examples, a trader(s) or user(s) sets the usage policy. In some examples, trade messages are prioritized based on the message type. For example, trade messages canceling a trade order may be prioritized over trade messages performing other trade orders (e.g., change or modify a previously communicated trade order, add a trade order, etc.). In some examples, trade messages are prioritized based on the risk position associated with each trade message. For example, trade messages associated with higher (or greater?) risk may be prioritized over trade messages associated with less risk. In some examples, trade messages are prioritized based on the likelihood of execution by the exchange. For example, trade messages may be prioritized based on their relationship to the inside market such that trade orders closer to the inside market may be given a higher priority than a similar trade order directed away from the inside market. In some examples, trade messages delayed from a previous transaction interval are assigned an improved message priority. For example, a trade message canceling a trade order may have a higher priority than a trade message adding a trade order that was delayed from a previous transaction interval, but may have a lower priority than a trade message canceling a trade order that was delayed from the previous transaction interval. In some examples, trade messages are prioritized based on the trader and/or trading device associated with the trade message. As different trading devices may be connected to an exchange link, the message priority for a trade message may be adjusted based on the trading device communicating the trade message. For example, a trader may pay extra to have an improved message priority for trade messages communicated by certain trading devices. Other bases for prioritizing trade messages are also possible.

The example process of FIG. 6 compares the message priority of the trade message to a transaction threshold (block 610). In some examples, the transaction threshold varies based on the usage policy. For example, the usage policy may vary the transaction threshold based on a transaction count of trade messages communicated to the example exchange 130 during the transaction interval. For example, the transaction threshold may be set to the lowest priority at the start of a transaction interval, may be set to a second priority when the transaction count approaches the artificial transaction limit, and may be set to third priority when the transaction count is greater than the artificial transaction limit (e.g., communicating trade messages using the reserve capacity). In the illustrated example, trade messages having a message priority less than the transaction threshold (block 610) are delayed in communicating to an exchange (block 615). For example, communicating the trade message may be delayed to the following transaction interval. In some examples, the trade message may be delayed within the same transaction interval (e.g., communicated to the exchange after trade messages with a higher message priority are communicated). In some examples, trade messages having a message priority less than the transaction threshold (block 610) are canceled by the example gateway 120. A determination is then made whether other trade messages remain to be communicated (block 635). When another trade message is received, control returns to block 610 to determine whether the message priority is greater than the transaction threshold. Otherwise, the example processes of FIGS. 4 and 6 end.

When the message priority of the trade message is greater than the transaction threshold (block 610), the trade message is communicated to the exchange (block 620). A transaction count of trade messages communicated to the exchange via the exchange link is updated (block 625). That is, the transaction count increases when a trade message is communicated to the exchange and the transaction count is monitored during the transaction interval. A determination is made whether the transaction threshold satisfies the usage policy (block 630). For example, the usage policy may change the transaction threshold based on the transaction count. When the transaction threshold does satisfy the usage policy (block 630), control proceeds to block 635 to determine if another trade message was received during the transaction interval.

Returning to block 630, when the transaction threshold does not satisfy the usage policy, the transaction threshold is updated (block 640). For example, a usage policy may set the transaction threshold so that all trade messages are communicated to the exchange 130 until the transaction count reaches the artificial transaction limit (block 640). When the transaction count is greater than the artificial transaction limit, the transaction threshold adjusts according to the usage policy so that high priority trade messages are communicated while low priority trade messages are not. As a result, the transaction threshold is updated. In some examples, when the transaction interval expires, the transaction threshold is set according to the usage policy. In some examples, an indication is sent to the downstream trading devices that are connected to the exchange link when the transaction threshold is adjusted. As a result, the trading device 110 may adjust the trade messages communicated to the gateway 120. For example, the trading device 110 of FIG. 1 may not communicate trade messages to the gateway 120 with a message priority less than the current transaction threshold (e.g., the trade message is delayed or canceled by the trading device 110 rather than the gateway 120 or the exchange 130). Control then proceeds to block 635 to determine if another trade message was received during the transaction interval.

Figure 7:
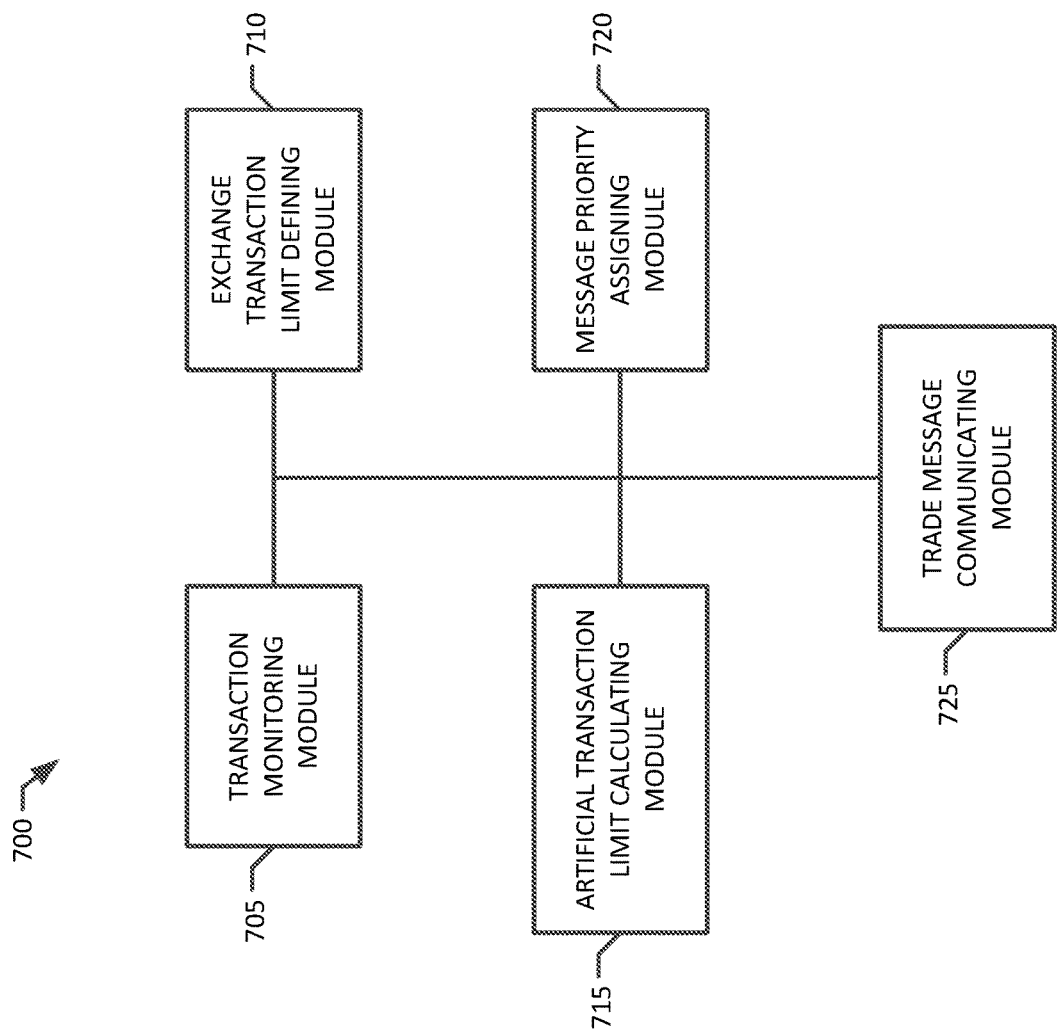
FIG. 7 illustrates a block diagram of an example message management system that can implement the example machine readable instructions of FIGS. 4-6.

FIG. 7 is a block diagram of an example system 700 that may implement and/or execute the example operations of FIGS. 4-6. In some examples, the system 700 may be implemented as part of software (or an application) associated with the gateway 120 of FIG. 1 and/or the gateway 220*a* of FIG. 2. In some examples, the system 700 may be implemented as computer implemented code or instructions operable independent of software associated with the gateway 120. In some examples, the features and functionality of the system 700 may be implemented in hardware operable in connection with the gateway 120 of FIG. 1 and/or the gateway 220*a* of FIG. 2.

The example system 700 of FIG. 7 includes a transaction monitoring module 705 to track the trade messages communicated to, and received by the example exchange 130 via the exchange link. For example, the transaction monitoring module 705 receives an indication that a trade message was communicated to the example exchange 130. As a result, the transaction monitoring module 705 increments a transaction count. In some examples, the transaction monitoring module 705 receives a response message from the example exchange 130. As a result, the transaction monitoring module 705 calculates message latency and average message latency. For example, the transaction monitoring module 705 compares the timestamp of the trade message communicated to the example exchange 130 to the timestamp of the response message corresponding to the trade message.

The example exchange transaction limit defining module 710 of the example system 700 defines the exchange transaction limit of the exchange link. In some examples, the exchange transaction limit is provided by the exchange 130 and stored by the exchange transaction limit defining module 710. In some examples, the exchange transaction limit defining module 710 calculates the exchange transaction limit. For example, the exchange transaction limit defining module 710 receives a transaction count indicating the number of trade messages communicated to the exchange 130 via an exchange link and an identifier of response messages received. As a result, the exchange transaction limit defining module 710 calculates the exchange transaction limit based on the transaction count when a rejection message is received. In some examples, the exchange transaction limit defining module 710 may receive an indication of the average message latency and an indication of the message latency calculated for a response message. As a result, the exchange transaction limit defining module 710 compares the message latency to the average message latency. When the message latency deviates from the average message latency, the exchange transaction limit is calculated based on the transaction count. In some examples, the exchange transaction limit defining module compares the deviation between the message latency and the average message latency to a minimum threshold to determine when to calculate the exchange transaction limit. In some examples, the exchange transaction limit defining module 710 uses a continuous series of deviations between the message latency and the average message latency to determine when to calculate the exchange transaction limit.

The example artificial transaction limit calculating module 715 of the example system 700 calculates the artificial transaction limit based on the exchange transaction limit. In some examples, the artificial transaction limit is a portion (or fraction, percentage, etc.) of the exchange transaction limit. In some examples, the artificial transaction limit is a constant value. For example, the artificial transaction limit creates a reserve capacity of 50 trade message communications. In some examples, the artificial transaction limit varies based on market conditions. For example, the artificial transaction limit may vary based on the time of day, the volume of trade messages communicated to the exchange, the activity levels corresponding to trade messages communicated via the exchange link.

The example message priority assigning module 720 of the example system 700 assigns a message priority to trade messages received from a trading device to communicate to the exchange 130. In some examples, a usage policy describing how trade messages should be processed at various transaction counts or times within the transaction interval determines the message priority. In some examples, the usage policy varies the message priority based on the trade message, the risk position of the trade message, the likelihood of execution of the trade message, the trader associated with the trade message and/or the transaction count.

The example trade message communicating module 725 of the example system 700 communicates trade messages to the exchange 130 based on the message priority of the trade message. For example, the trade message communicating module 725 compares the message priority of the trade message to a transaction threshold. In some such examples, trade messages with a message priority less than the transaction threshold are delayed and/or canceled. Otherwise, when the message priority of the trade message is greater than the transaction threshold, the trade message is communicated to the exchange 130. In some examples, the transaction threshold varies based on the transaction count. For example, a usage policy may adjust (e.g., increase) the transaction threshold when the transaction count approaches the artificial transaction limit. As a result, the trade messages having a first message priority may be communicated to the exchange 130 during the period of the increased transaction threshold while trade the messages having a second message priority may be delayed (e.g., delayed to a subsequent transaction interval or to a later period during the transaction interval) and/or canceled (e.g., not communicated to the exchange 130). In some examples, the trade message communicating module 725 maintains a trade message queue of trade messages received and/or delayed. As a result, a delayed trade message may be moved to the end of the message queue.

VI. EXAMPLES OF PREVENTING ADVERSE EXCHANGE LIMIT EFFECTS AT THE EXCHANGE

As described above, an exchange may limit the number of trade messages communicated over an exchange link during a period (e.g., a transaction interval). In some examples, the exchange communicates a warning message to the gateway along with the response message based on a transaction count. For example, the exchange may communicate a response message to the gateway indicating that the transaction count is nearing the exchange transaction limit. In response, the gateway may adjust or modify further trade messages communicated to the exchange.

Figure 8:
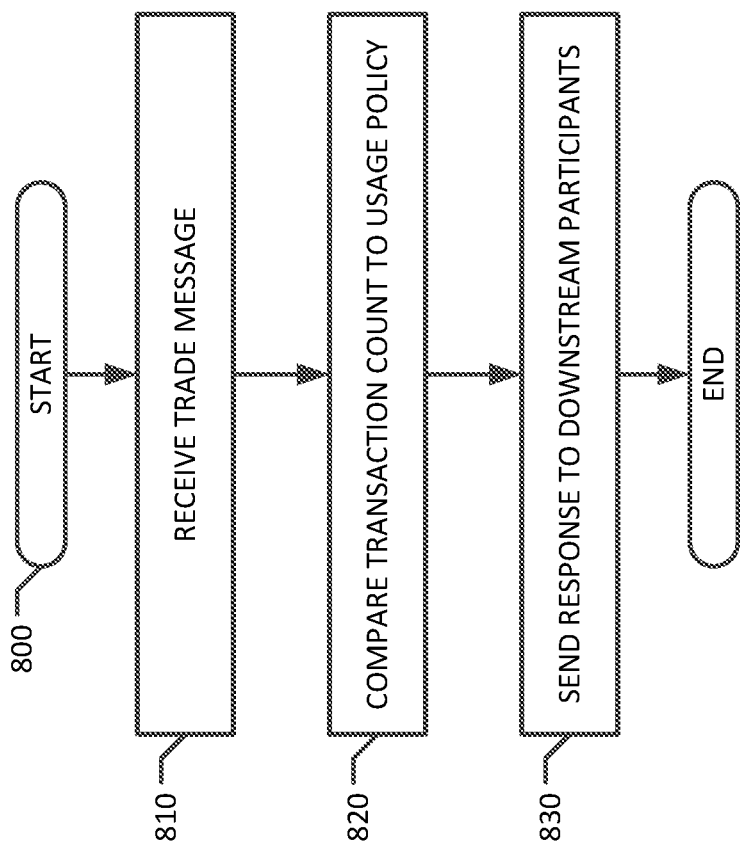
FIG. 8 illustrates a flow diagram representative of example machine instructions that may be executed to implement disclosed embodiments.

FIG. 8 is a flow diagram representative of example operations that can be executed to communicate a warning message to a gateway based on a transaction count. The example process 800 of FIG. 8 begins when an exchange (e.g., the example exchange 130 of FIG. 1) receives a trade message via an exchange link (block 810). For example, a gateway (e.g., the example gateway 120 of FIG. 1) communicates a trade message to the exchange 130 via an exchange. As a result, the exchange 130 increments a counter tracking the number of trade messages received via the exchange link.

The example exchange 130 compares the transaction count to a usage policy to determine a response to communicate to the example gateway 120 (block 820). In some examples, the comparison causes the exchange 130 to communicate an alert or warning message. For example, the exchange 130 communicates a message (block 830) alerting the gateway 120 that the transaction count is greater than the artificial transaction limit. Additionally, the example exchange 130 may alert the downstream participants regarding the activity of the exchange link. For example, the exchange 130 informs the downstream participants the number of trading devices communicating trade messages via the exchange link. In some examples, the exchange 130 further communicates an offer to one or more trading devices 110 to switch to a different exchange link. For example, the exchange 130 transfers a trading device 110 from the current exchange link to a relatively less active exchange link when the trading device 110 responds to the offer by accepting the offer. In some examples, the example gateway 120 may adjust or modify subsequent trade messages communicated. In some examples, the exchange 130 communicates to the downstream participants an offer to purchase additional trade messages. For example, when the transaction count is greater than a portion of the exchange transaction limit (block 820), the exchange 130 communicates an offer to purchase additional trade messages to communicate high priority trade messages. In some examples, the exchange 130 communicates the warning message based on the trader associated with the trade message that prompts the warning message. In some examples, the exchange 130 communicates the warning message to select traders (e.g., traders enrolled in a program to receive warning messages) regardless of which trader is associated with the trade message that prompts the warning message. The example process of FIG. 8 then ends.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
    communicating, by a gateway device via an exchange link coupled with the gateway device, trade messages to an exchange;
    tracking, by the gateway device, a transaction count of trade messages communicated to the exchange via the exchange link during a time period;
    obtaining, by the gateway device, a first transaction limit for trade messages associated with the transaction count and communicated during the time period;
    determining, by the gateway device, a second transaction limit based on the first transaction limit, wherein the second transaction limit represents a reserve capacity of the exchange link;
    receiving, by the gateway device from one or more trading devices, a plurality of trade messages to be communicated to the exchange;
    assigning, by the gateway device, a message priority to each of the plurality of trade messages received from the one or more trading devices;
    in response to determining that the tracked transaction count is greater than the second transaction limit during the time period, (i) communicating, by the gateway device, trade messages of the plurality of trade messages having a first message priority to the exchange, and (ii) rejecting, by the gateway device, trade messages of the plurality of trade messages having a second message priority, when the second message priority is lower than the first message priority.

2. The method of claim 1, wherein the second transaction limit varies based on a time of day.

3. The method of claim 1, wherein the second transaction limit varies based on the transaction count.

4. The method of claim 1, wherein the message priority is based on a message type of each of the plurality of trade messages.

5. The method of claim 1, wherein the message priority is based on a trader associated with each of the plurality of trade messages.

6. The method of claim 1, wherein the message priority is based on a risk position associated with each of the plurality of trade messages.

7. The method of claim 1, wherein the message priority is based on a likelihood of execution associated with each of the plurality of trade messages.

8. The method of claim 1, wherein the message priority is based on the transaction count.

9. The method of claim 1, wherein the first transaction limit is associated with a rejection message communicated from the exchange via the exchange link.

\* \* \* \* \*